United States Patent

[11] 3,560,803

| | | | | | |
|---|---|---|---|---|---|
| [72] | Inventor | Kelvin Shih | 3,003,088 | 10/1961 | Hechler ................ 317/151 |
| | | Detroit, Mich. | 3,391,306 | 7/1968 | Piccione ........... 317/148.5BUX |
| [21] | Appl No | 742,764 | 3,191,101 | 6/1965 | Reszka ............ 317/123CDUX |
| [22] | Filed | July 5, 1968 | | | |
| [45] | Patented | Feb. 2, 1971 | | | |
| [73] | Assignee | Burroughs Corporation | | | |
| | | Detroit, Mich. | | | |
| | | a corporation of Michigan | | | |

*Primary Examiner*—Robert K. Schaefer
*Assistant Examiner*—William J. Smith
*Attorneys*—Kenneth L. Miller, Wallace P. Lamb, Paul W. Fish and Edwin W. Uren

[54] ACTUATOR SYSTEM
3 Claims, 6 Drawing Figs.

[52] U.S. Cl. .................................................. 317/151, 317/123, 317/148.5
[51] Int. Cl. ................................................ H01h 47/32
[50] Field of Search ........................................ 317/123, 123RM, 123CD, 148.53, 151

[56] References Cited
UNITED STATES PATENTS
3,172,019  3/1965  Ragonese .................. 317/123CDUX ABSTRACT: An actuator system having a parallel inductor-capacitor circuit connected in electrical series with the actuator coil. The capacitor follows a positive half cycle oscillation and thereby becomes reversed charged. A silicon controlled rectifier, responsive to the negative half cycle of oscillation, electrically connects the reversed charged capacitor in series with the supply voltage and thereby providing an increased operating voltage to the actuator coil. The capacitor is recharged through the actuator coil completing the operation of the actuator.

PATENTED FEB 2 1971 3,560,803
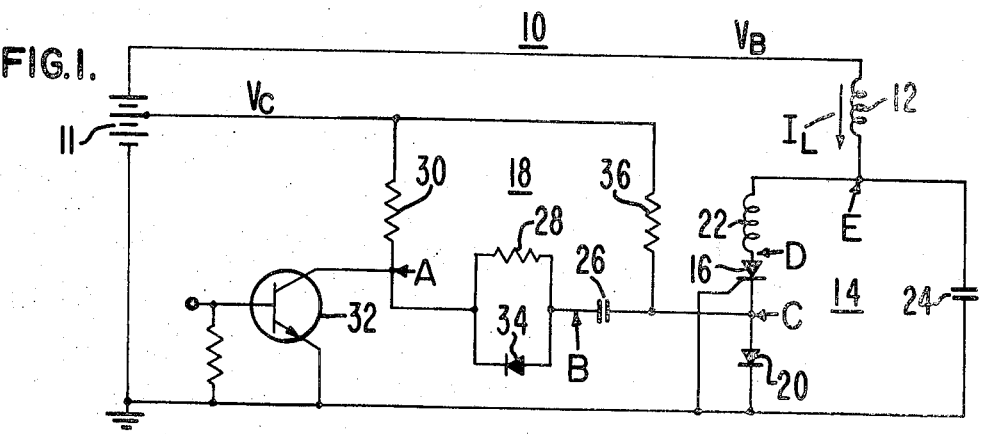
FIG. 1.
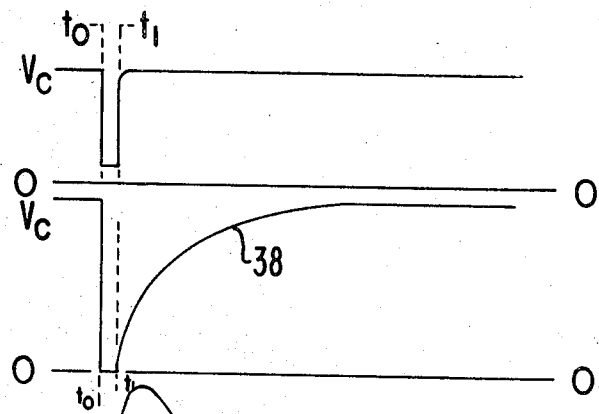
FIG. 2. "A"
FIG. 3. "B"
FIG. 4. "C"
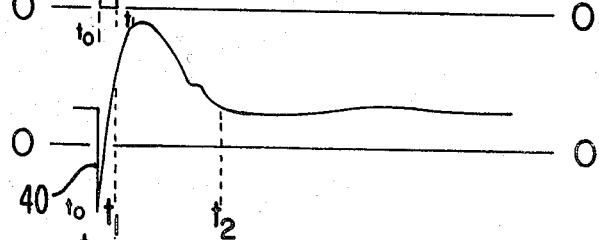
FIG. 5. "D"
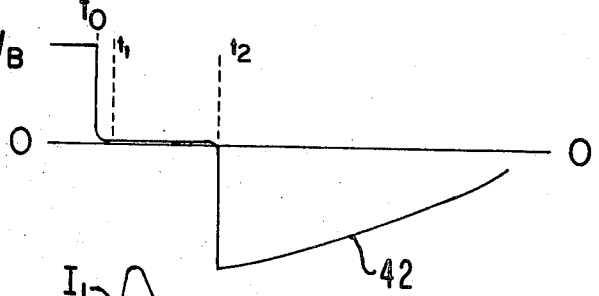
FIG. 6. "E"
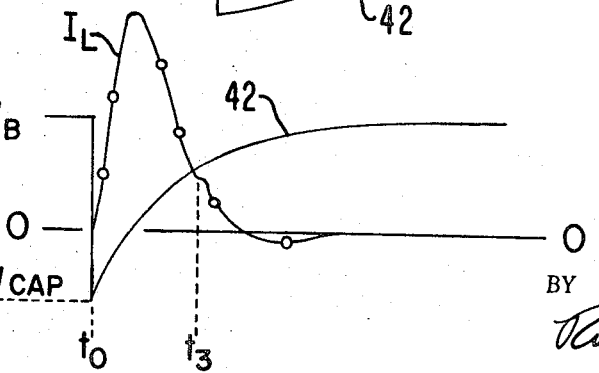
INVENTOR.
KELVIN SHIH.
BY
Russel C. Wells
ATTORNEY.

３,560,803

ACTUATOR SYSTEM

PRIOR ART

Prior art actuator systems for machines such as high speed line printers as used in data processing, have relied on the discharge current from a capacitor to provide sufficient power for actuator operation. It was then necessary to provide a charge path for the capacitor prior to the next operation. If the allowed time for charging was very short, a large current surge was demanded from the power supply to charge the capacitor.

It is the object of this invention to utilize the charged voltage of a capacitor as an additional supplemental voltage to the supply voltage to operate an actuator.

SUMMARY OF INVENTION

An actuator system having an inductive coil actuator is electrically connected in a series circuit with a capacitor. A control member electrically connected in series with an inductor is connected in parallel with the capacitor. The capacitor is fully charged to the supply voltage. The control member operates to transfer the charge on one plate of the capacitor through the inductor to the opposite plate of the capacitor. The control member electrically connects the reversed charged capacitor in series with the supply voltage to effect actuation of the actuator by a voltage which is the sum of the supply voltage and the charge voltage on the capacitor.

DESCRIPTION OF DRAWINGS

In the drawings:

FIG. 1 is a schematic illustration of an actuator system embodying the invention;

FIG. 2, through FIG. 6 are illustrations of the voltage or current waveforms at various points in the system of FIG. 1.

DETAILED DESCRIPTION

Referring to FIG. 1, there is illustrated an actuator system 10 such as can be used for controlling a hammer actuator in printing apparatus. The system 10 comprises an actuator coil 12 connected in series with an underdamped oscillator circuit 14 having a control member 16, such as a silicon controlled rectifier, in the inductor leg. The control member 16, hereinafter referred to as an SCR, is operated by a suitable triggering circuit 18 such as illustrated in FIG. 1. A voltage source 11 provides the operating voltages and the biasing voltages for both the actuator coil and the trigger circuit. The voltages are represented by $V_B$ and $V_C$ which for the purposes of illustration, are positive and $V_B$ is greater than $V_C$.

The oscillator circuit 14 is a parallel LC "tank" circuit having the SCR 16 and a biasing diode 20 in the inductor 22 leg. The junction of the inductor 22 and the capacitor 24 is electrically connected to one side of the actuator coil 12. The SCR 16 and the diode 20 are electrically connected in series to permit conventional current flow from anode to cathode in each device. Since both the SCR 16 and the diode 20 have low forward resistance and the actuator 12, capacitor 24 and the inductor 22 are reactive components, the heat loss of the system is extremely small.

The trigger circuit 18 provides a means for negative triggering of the SCR 16 by signal having at least a minimum time interval between successive signals. A timing capacitor 26 is connected by one plate to the junction of the SCR 16 and the biasing diode 20 and by its other plate through two timing resistors 28 and 30 to the voltage $V_C$. The input to the trigger circuit is a transistor switch 32 having its emitter grounded and its collector connected to the junction of the two timing resistors 28 and 30. A speed-up diode 34 is connected in parallel with the resistor 28 providing a low resistance discharge path for the capacitor 26 through the transistor 32. A resistor 36 connected between the cathode of the SCR 16 and the voltage source $V_C$ provides a bias level for the SCR 16.

OPERATION

As is well known, in an inductor such as the actuator coil 12, the current build up lags behind the voltage applied across the inductor, while in a capacitor the converse is true, the current build up leads the voltage build up. The actuator current, $I_L$ in FIG. 1 and illustrated in FIG. 6, is composed almost entirely of the charging current of the capacitor 24 and therefore when the actuator 12 operates, indicated at $t_3$ in FIG. 6, the current in the coil has been substantially reduced due to the charge build up on the capacitor 24.

A positive pulse of short time duration is applied to the base of transistor 32 to initiate the operation of the actuator system 10. By the action of the transistor 32, the pulse is inverted at the collector and is as shown in FIG. 2. The applied pulse turns the transistor 32 on which provides a discharge path for the timing capacitor 26 through the diode 34. Since both the diode 34 and the collector-emitter path of a conducting transistor 32 have low resistance, the discharge time of the capacitor 26 is very rapid. This is shown in FIG. 3 which is the voltage waveform 38 on the left-hand plate of the capacitor 26 as viewed in FIG. 1.

The right-hand plate of the capacitor 26 is biased to a voltage slightly above ground due to the voltage divider network of the resistor 36 and the forward biased diode 20. This voltage divider network also biases the cathode of the SCR 16 nonconductive. With the SCR nonconductive, the oscillator circuit 14 is not operating and the capacitor 24 is charged to the supply voltage $V_B$. The current through the actuator coil 12 is zero.

When the left-hand plate of the timing capacitor is discharged, a negative pulse is reflected to the anode of the biasing diode 20, thereby causing the gate of the SCR 16 to become forward biased with respect to the cathode and the SCR is driven into conduction. The voltage waveform 40 of the negative trigger voltage at the anode of the SCR is illustrated in FIG. 4.

With the SCR 16 in conduction, the underdamped oscillator 14 starts to oscillate and also a current starts to flow through the actuator 12 and SCR. As previously mentioned, this current is small due to the electrical inertia of the coil 12. The upper plate of the capacitor 24 is rapidly discharged through the inductor 22 and the SCR 16. The magnetic field in the inductor 22 which is generated by the discharge current of the capacitor 24, causes the lower plate of capacitor 24 to become charged to a voltage $_{CAP}$ which in absolute value is less than $V_B$ as shown in FIG. 6. This voltage is negative with respect to $V_B$ and, therefore, the capacitor is reversely charged. The SCR is driven out of conduction either when the oscillator current falls below the holding current of the SCR 16 or the lower plate of the capacitor 24 starts to discharge. This is shown at $t_2$ in FIGS. 4 and 5. For the purposes of illustration and with appropriate component values such as hereafter shown, the time $t_1 - t_0$ which is the trigger pulse time is approximately 16 microseconds and the time $t_2 - t_0$, which is the conduction time of SCR 16, is 160 microseconds.

At time $t_2$, the capacitor 24 is reversely charged to the voltage $V_{CAP}$, and the SCR 16 is nonconducting. The capacitor 24 is in effect a supplement voltage source and because the SCR 16 is nonconductive it is supplemented to the voltage source 11 for the actuator 12 and the applied voltage across the actuator is the summation of the $V_B$ and $V_{CAP}$. The upper plate of the capacitor 24 then charges as shown in waveform 42 in FIGS. 5 and 6, from $V_{CAP}$ through the actuator 12 to $V_B$. This charge current is shown in FIG. 6 as the $I_L$ of the actuator. As the capacitor 24 becomes fully charged, the actuator operates at time $t_3$. At this time, $I_L$ is approximately 10—20 percent of its peak value. Time $t_3 - t_0$ is approximately 1.50 milliseconds. Thus the actuator coil 12 is energized by both the current through the SCR 16 and the charging current of the capacitor 24.

During the charging time of the capacitor 24, the timing capacitor 26 is also charging, see waveform 38, through its timing resistor 28 and 30. When this capacitor is fully charged, the operation can be repeated.

For the purposes of illustration, the following component values are used in the preferred embodiment of the actuator system.

In the oscillator circuit 14:
$V_B$    145V
Inductor 22    51.5 MH.
Capacitor 24    6 $\mu$f
In the trigger circuit:
$V_C$    5V
Capacitor 26    0.047 $\mu$f
Resistor 28    200K
Resistor 30    6K
Resistor 36    2K An actuator system utilizing a parallel oscillator has been described to provide the actuator operating current. The oscillator capacitor, after its first positive half cycle of oscillation is effectively connected by a control member as a supplemental voltage source in series with the main voltage source supplied to the actuator. A control element in series with the oscillator inductor is responsive to the negative half cycle oscillator current to effect this connection. The charging current of the oscillator capacitor is supplied to operate the actuator.

I claim:

1. An actuator system comprising:
    an actuator coil connected at one end to a source of voltage;
    a capacitor electrically connected in a first series circuit with said actuator coil, said capacitor normally charged to said voltage source through said actuator;
    an inductor;
    a control member electrically connected in a second series circuit with said inductor, said second series circuit electrically connected in parallel circuit with said capacitor; and
    said control member operable to energize said inductor to transfer the charge on one plate of said capacitor to the other plate, thereby effectively connecting said capacitor as a supplemental voltage source to said voltage source activating said actuator with the charge current of said capacitor.

2. The actuator system according to claim 1 wherein the control member is a silicon controlled rectifier.

3. The actuator circuit according to claim 1 wherein said inductor and said capacitor are electrically connected as an underdamped oscillator.